(12) United States Patent
Weisenstein et al.

(10) Patent No.: US 12,519,185 B2
(45) Date of Patent: Jan. 6, 2026

(54) CARBON ADHERED GRAPHITE TABS FOR BATTERY TERMINAL FASTENING

(71) Applicant: AEsir Technologies, Inc., Bozeman, MT (US)

(72) Inventors: Adam Weisenstein, Bozeman, MT (US); Hannah S. Smith, Bozeman, MT (US); Melissa D. McIntyre, Butte, MT (US)

(73) Assignee: AESIR TECHNOLOGIES, INC., Bozeman, MT (US)

( * ) Notice: Subject to any disclaimer, the term of this patent is extended or adjusted under 35 U.S.C. 154(b) by 0 days.

(21) Appl. No.: 18/405,610

(22) Filed: Jan. 5, 2024

(65) Prior Publication Data

US 2025/0226549 A1    Jul. 10, 2025

(51) Int. Cl.
| | |
|---|---|
| *H01M 50/534* | (2021.01) |
| *H01M 4/02* | (2006.01) |
| *H01M 4/04* | (2006.01) |
| *H01M 4/133* | (2010.01) |
| *H01M 4/1393* | (2010.01) |
| *H01M 4/583* | (2010.01) |
| *H01M 4/62* | (2006.01) |
| *H01M 4/66* | (2006.01) |
| *H01M 50/178* | (2021.01) |

(Continued)

(52) U.S. Cl.
CPC ....... *H01M 50/534* (2021.01); *H01M 4/0404* (2013.01); *H01M 4/663* (2013.01); *H01M 50/178* (2021.01); *H01M 50/538* (2021.01); *H01M 2004/021* (2013.01); *H01M 4/133* (2013.01); *H01M 4/1393* (2013.01); *H01M 4/583* (2013.01); *H01M 4/625* (2013.01); *H01M 50/528* (2021.01); *H01M 50/536* (2021.01); *H01M 50/562* (2021.01); *H01M 50/567* (2021.01)

(58) Field of Classification Search
CPC ............. H01M 50/178; H01M 50/534; H01M 50/538; H01M 4/0404; H01M 4/663; H01M 2004/021; H01M 2004/027; H01M 2004/028; H01M 2004/029; H01M 4/133; H01M 4/1393; H01M 4/583; H01M 4/587; H01M 4/625; H01M 50/528; H01M 50/533; H01M 50/536; H01M 50/54; H01M 50/562; H01M 50/567
See application file for complete search history.

(56) References Cited

U.S. PATENT DOCUMENTS

| | | |
|---|---|---|
| 6,979,513 B2 | 12/2005 | Kelley et al. |
| 8,465,871 B2 | 6/2013 | Juzkow et al. |

(Continued)

OTHER PUBLICATIONS

Qiao et al., "Corrosion of graphite electrode in electrochemical advanced oxidation processes: Degradation protocol and environmental implication," Mar. 21, 2018, Chemical Engineering Journal, 344, 410-418. (Year: 2018).*

*Primary Examiner* — Matthew W Van Oudenaren
(74) *Attorney, Agent, or Firm* — Brooks Kushman P.C.

(57) ABSTRACT

An electrochemical cell includes a plurality of electrode graphite substrates each defining a current collector and a tab continuing from the current collector, the tabs being collected into at least one stack, and a plurality of carbon layers interleaved with the at least one stack such that each of the carbon layers is adhered between two of the graphite electrode tabs.

11 Claims, 3 Drawing Sheets

(51) Int. Cl.
  *H01M 50/528* (2021.01)
  *H01M 50/536* (2021.01)
  *H01M 50/538* (2021.01)
  *H01M 50/562* (2021.01)
  *H01M 50/567* (2021.01)

(56) References Cited

U.S. PATENT DOCUMENTS

| | | | |
|---|---|---|---|
| 2003/0003369 A1* | 1/2003 | Dai | H01M 10/0568 |
| | | | 29/623.1 |
| 2011/0212359 A1 | 9/2011 | Dai et al. | |
| 2012/0141864 A1* | 6/2012 | Juzkow | H01M 50/536 |
| | | | 977/948 |
| 2021/0028452 A1* | 1/2021 | Su | H01M 4/623 |

* cited by examiner

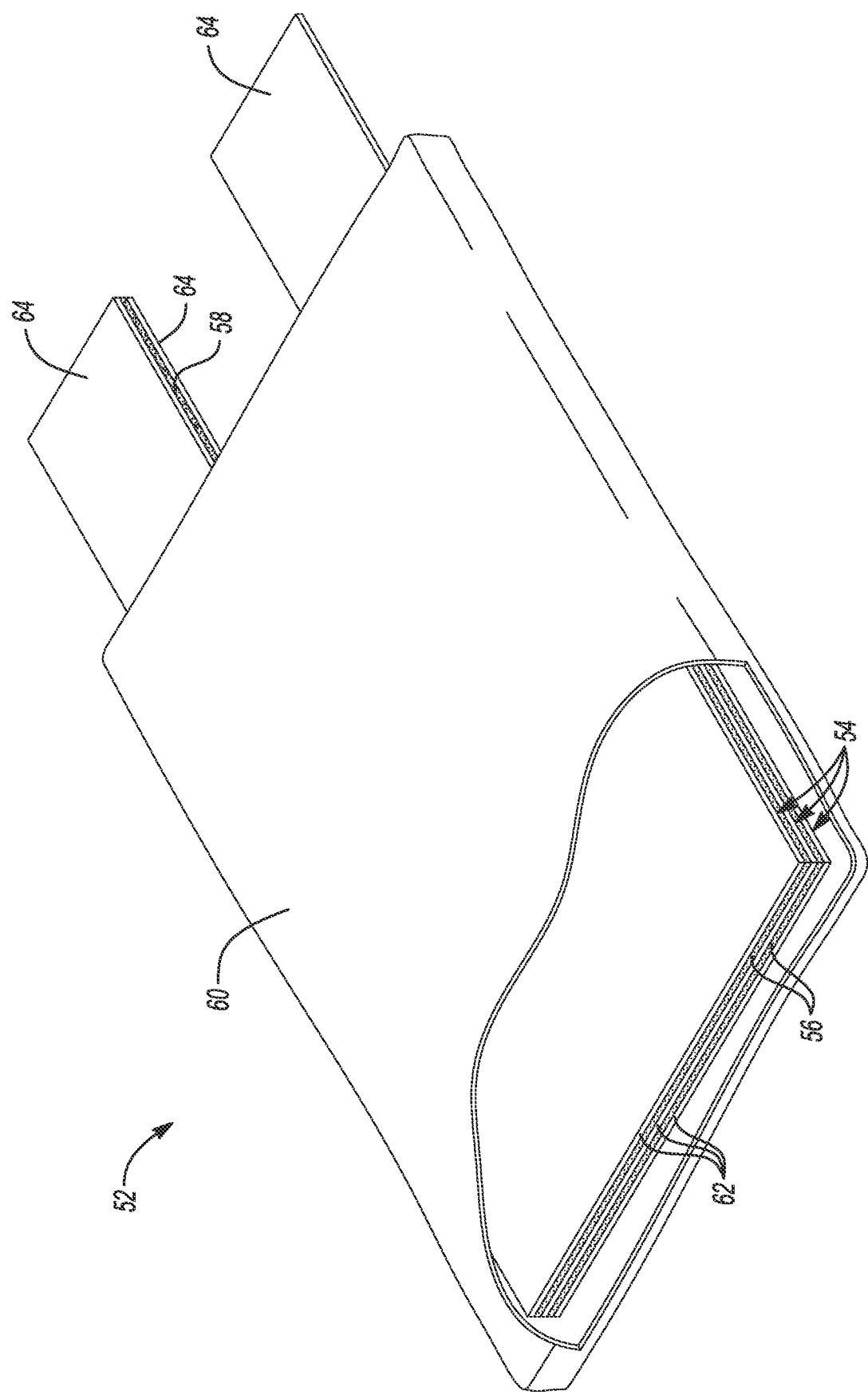

CARBON ADHERED GRAPHITE TABS FOR BATTERY TERMINAL FASTENING

STATEMENT REGARDING FEDERALLY SPONSORED RESEARCH OR DEVELOPMENT

The invention was made with Government support under Contract No. NSF 20-545. The Government has certain rights to the invention.

TECHNICAL FIELD

This disclosure relates to batteries.

BACKGROUND

An electrochemical cell may include an electrolyte, separator, anode, and cathode.

SUMMARY

An electrochemical cell includes a plurality of electrode graphite substrates each defining a current collector and a tab continuing from the current collector, the tabs being collected into at least one stack, a plurality of carbon layers interleaved with the at least one stack such that each of the carbon layers is adhered between two of the graphite electrode tabs, a cell terminal, and a mechanical fastener clamping the at least one stack and cell terminal together.

A pouch cell includes a plurality of electrode graphite substrates each defining a current collector and a tab continuing from the current collector, at least one carbon layer adhered between two of the tabs, and a pouch containing the electrode graphite substrates and adhered to the at least one stack.

A method for manufacturing an electrochemical cell includes coating graphite electrode tabs, each defined by and continuing from a current collector portion of an electrode graphite substrate, with a carbon slurry to form wet coated graphite electrode tabs, collecting the wet coated graphite electrode tabs into at least one wet stack, and clamping the at least one wet stack together while the at least one wet stack dries resulting in at least one bonded and conductive dry stack.

BRIEF DESCRIPTION OF THE DRAWINGS

FIG. 4 is a perspective view, in partial cut-away, of a pouch cell in which certain graphite continuous tabs are adhered together with a conductive carbon to produce a single integrated tab.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Carbon adhered graphite tabs for battery terminal fastening are contemplated. Carbon slurry may be applied to graphite tabs when wet and then secured together to form a highly conductive merging of the tabs. The carbon slurry may also partially penetrate the graphite tabs. The resulting carbon adhered tabs are stronger and less resistive than bolted graphite tabs without the carbon adhesion.

Prior to casting an electrode onto a graphite current collector, a carbon suspension eventually used to adhere graphite tabs to terminals may be used to coat the entire surface of the electrode substrate, including tabs and face of the substrate that will be in contact with electrode active material. This same carbon suspension may also be included in the formulation of the active electrode slurry, along with the active material, a long-range conductive additive such as carbon fiber, binder, gelling agent, and additional chemical additives. This slurry may then be cast onto the carbon coated substrate.

By including the carbon suspension, long range conductive additive, and active material in the electrode slurry, a conductive matrix can be formed that directly and continuously connects the active material to the carbon coated substrate. Along with the carbon coated tabs, which are a continuation of the carbon coated substrate, the carbon coated substrate and carbon coating included in the slurry reduce the contact resistance associated with the connection of the active material to the bulk electrode, electrode-to-substrate connection, and substrate to tab connection. Once the battery is built and the tabs are adhered to the terminal, there is a continuous conductive matrix connecting the active material directly to the terminal of the battery.

Figure 1:
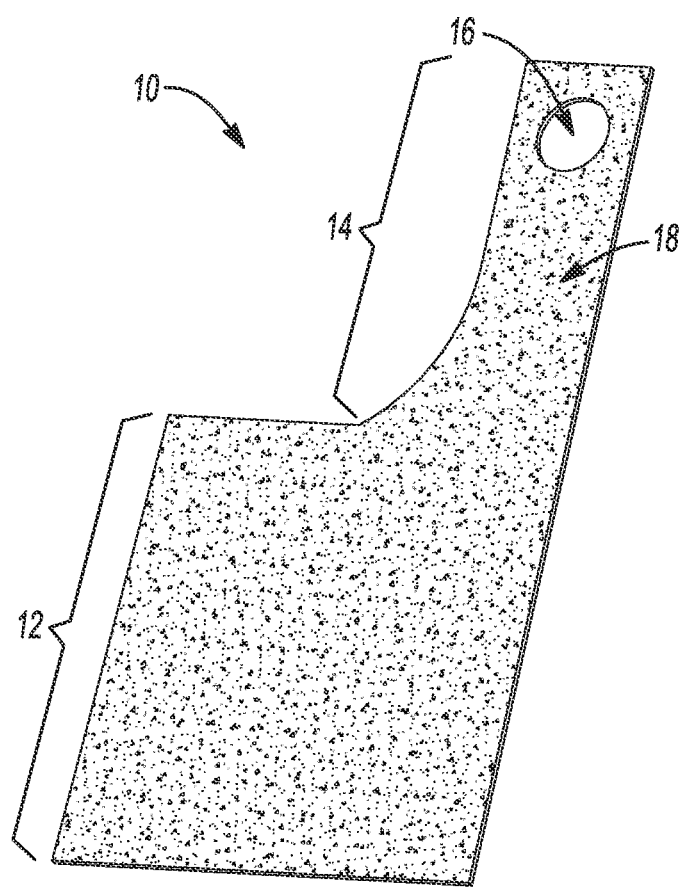
FIG. 1 is a perspective view of a graphite current collector and continuous tab coated with conductive carbon, used for adhesion of the graphite tab.

Referring to FIG. 1, an electrode graphite substrate 10 defines a current collector portion 12 and a tab 14 continuing from the current collector portion 12. In this example, the tab 14 defines a hole 16 to accommodate a mechanical fastener as explained in more detail below. The electrode graphite substrate 10 is coated with a carbon-based material 18. The electrode graphite substrate 10 may also be coated with an active material, etc. as mentioned above, which also can be represented by numbered element 18.

Figure 2:
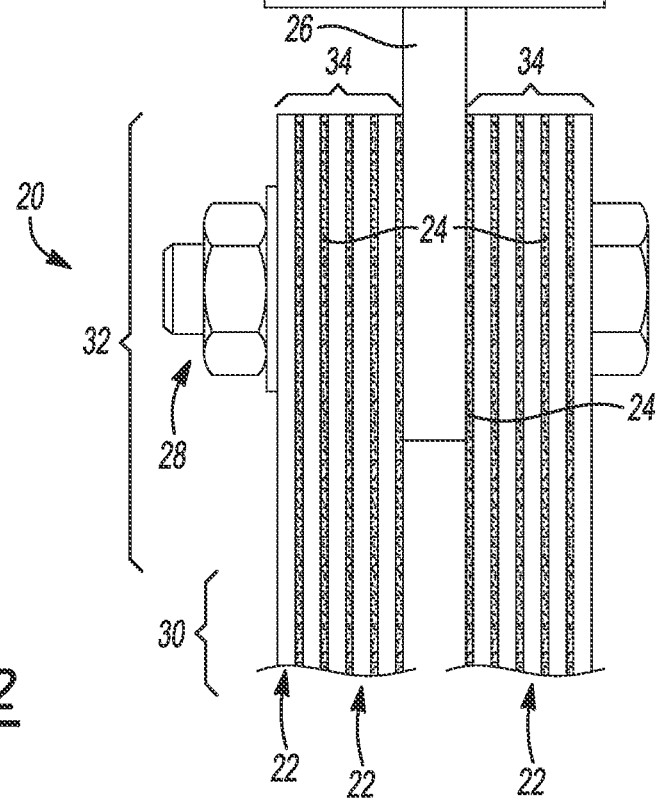
FIG. 2 is a side view of a portion of a prismatic cell in which continuous graphite tabs are adhered together with a conductive carbon and bolted to a terminal.

Referring to FIG. 2, a battery assembly 20 includes a plurality of electrode graphite substrates 22, a plurality of carbon layers 24, a cell terminal 26, and a bolt and nut 28. Each of the electrode graphite substrates 22 defines a current collector portion 30 and a tab 32. Here, the tabs 32 are collected into two stacks 34. The carbon layers 24 are interleaved with each of the stacks 34 such that each of the carbon layers 24 is adhered between two of the tabs 32 or the cell terminal 26 and one of the tabs 32.

Figure 3:
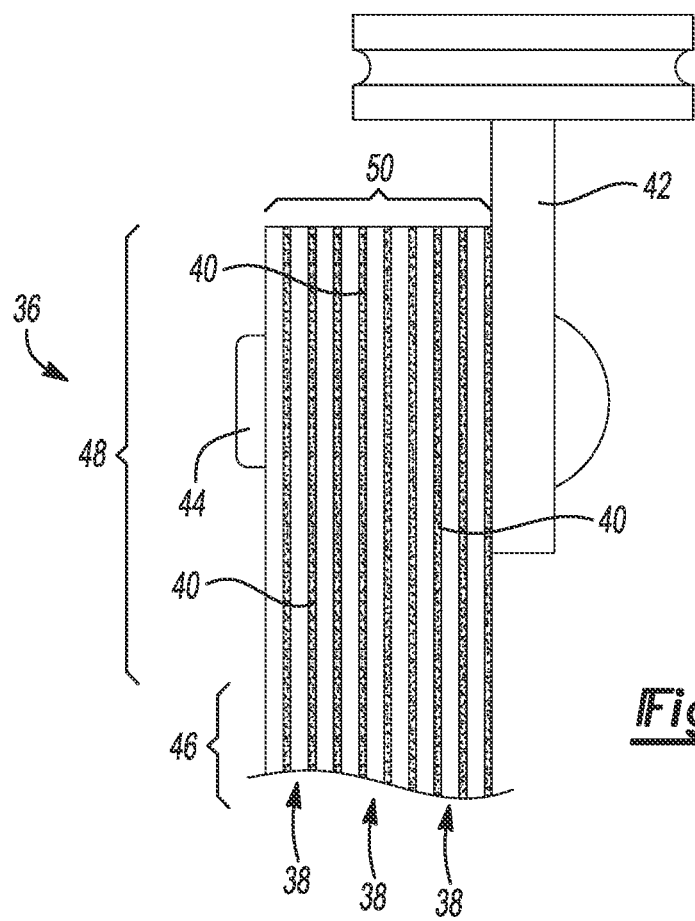
FIG. 3 is a side view of a portion of a prismatic cell in which continuous graphite tabs are adhered together with a conductive carbon and riveted to a terminal.

Referring to FIG. 3, a battery assembly 36 includes a plurality of electrode graphite substrates 38, a plurality of carbon layers 40, a cell terminal 42, and a rivet 44. Each of the electrode graphite substrates 38 defines a current collector portion 46 and a tab 48. Here, the tabs 48 are collected into a single stack 50. The carbon layers 40 are interleaved with the stack 50 such that each of the carbon layers 40 is adhered between two of the tabs 48 or the cell terminal 42 and one of the tabs 48.

Referring to FIG. 4, a battery assembly 52 includes a plurality of electrode graphite substrates 54, a plurality of separator systems 56, a carbon layer 58, and a pouch 60. Each of the electrode graphite substrates 54 defines a current collector portion 62 and a tab 64. The carbon layer 58 is adhered between two of the tabs 64. The pouch 60 contains the separator systems 56 and current collector portions 62, which are interleaved with each other, an electrolyte, and the tabs 62 extend therethrough.

Figure 5:
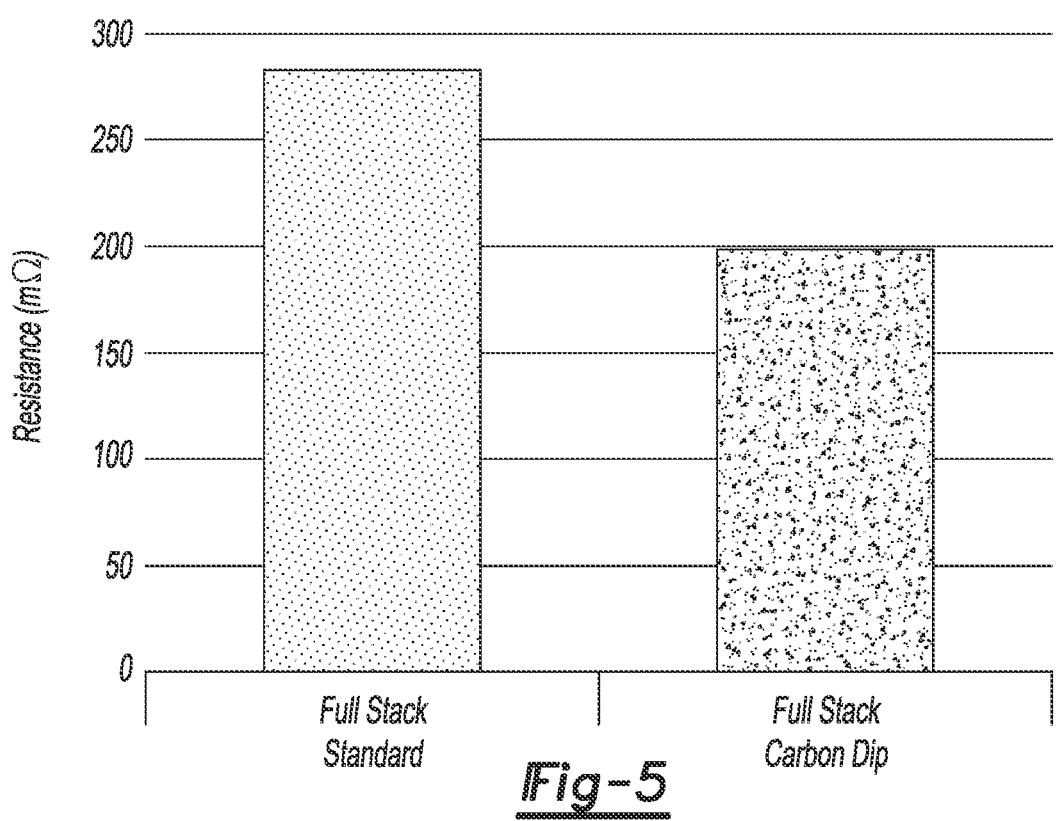
FIG. 5 is a column graph of the total resistance in graphite current collectors and tabs. The graphite tabs adhered together with a carbon slurry have decreased resistance by about 30%.

Referring to FIG. 5, graphs of total resistance in graphite current collectors and tabs show that those held together with a carbon slurry have a decreased resistance by about 30%.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials.

As previously described, the features of various embodiments may be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electrochemical cell comprising:
   a plurality of electrode graphite substrates each defining a current collector and a tab continuing from the current collector, the tabs being collected into at least one stack;
   a plurality of carbon layers interleaved with the at least one stack such that each of the carbon layers is adhered to each of, and between, two of the graphite electrode tabs;
   a cell terminal; and
   a mechanical fastener clamping the at least one stack and cell terminal together.

2. The electrochemical cell of claim 1, wherein the current collectors are carbon coated.

3. The electrochemical cell of claim 2, wherein the current collectors are further active material coated.

4. The electrochemical cell of claim 3, wherein material with which the current collectors are active material coated includes carbon.

5. The electrochemical cell of claim 1, wherein the at least one stack is a pair of stacks and the cell terminal is disposed between the pair.

6. The electrochemical cell of claim 1, wherein the mechanical fastener is a bolt and nut.

7. The electrochemical cell of claim 1, wherein the mechanical fastener is a rivet.

8. A pouch cell comprising:
   a plurality of electrode graphite substrates each defining a current collector and a tab continuing from the current collector;
   at least one carbon layer adhered to each of, and between, two of the tabs; and
   a pouch containing the electrode graphite substrates and adhered to the at least one stack.

9. The pouch cell of claim 8, wherein the current collectors are carbon coated.

10. The pouch cell of claim 9, wherein the current collectors are further active material coated.

11. The pouch cell of claim 10, wherein material with which the current collectors are active material coated includes carbon.

* * * * *